US011247530B2

(12) United States Patent
Lee et al.

(10) Patent No.: US 11,247,530 B2
(45) Date of Patent: Feb. 15, 2022

(54) VEHICULAR AIR CONDITIONING SYSTEM AND CONTROL METHOD THEREOF

(71) Applicant: Hanon Systems, Daejeon (KR)

(72) Inventors: Chan Young Lee, Daejeon (KR); Seok Kim, Daejeon (KR); Sung Jin Kim, Daejeon (KR); Boo Yong Um, Daejeon (KR); Young In Kim, Daejeon (KR); Young Ju Kim, Daejeon (KR)

(73) Assignee: Hanon Systems, Daejeon (KR)

( * ) Notice: Subject to any disclaimer, the term of this patent is extended or adjusted under 35 U.S.C. 154(b) by 192 days.

(21) Appl. No.: 16/653,103

(22) Filed: Oct. 15, 2019

(65) Prior Publication Data

US 2020/0122548 A1    Apr. 23, 2020

(30) Foreign Application Priority Data

Oct. 19, 2018  (KR) .................... 10-2018-0124832
Jan. 29, 2019  (KR) .................... 10-2019-0011367

(51) Int. Cl.
   *B60H 1/00*    (2006.01)
   *B60S 1/54*    (2006.01)

(52) U.S. Cl.
   CPC ..... *B60H 1/00671* (2013.01); *B60H 1/00878* (2013.01); *B60S 1/54* (2013.01)

(58) Field of Classification Search
   CPC .......... B60H 1/00671; B60H 1/00835; B60H 1/00842; B60H 1/00864; B60H 1/00878; B60H 2001/00707; B60S 1/54
   See application file for complete search history.

(56) References Cited

U.S. PATENT DOCUMENTS

| 4,562,954 A | * | 1/1986 | Kajita | ................ B60H 1/00842 165/42 |
| 4,856,710 A | * | 8/1989 | Takada | ................ B60H 1/00842 236/13 |
| 6,032,723 A | * | 3/2000 | Tsuihiji | ............. B60H 1/00842 165/204 |

* cited by examiner

*Primary Examiner* — Marc E Norman
(74) *Attorney, Agent, or Firm* — Norton Rose Fulbright US LLP; James R. Crawford

(57) ABSTRACT

A vehicular air conditioning system and a control method thereof are provided. The vehicular air conditioning system includes: a plurality of mode doors configured to switch an air discharge mode in a passenger compartment, the mode doors including a defogging door, a vent door and a floor door; and a mode door air pressure reduction part configured to temporarily reduce an air pressure acting on at least one of the mode doors when the air discharge mode is switched.

22 Claims, 9 Drawing Sheets

Conventional mode cam

Mode cam of the present invention

FIG. 5A
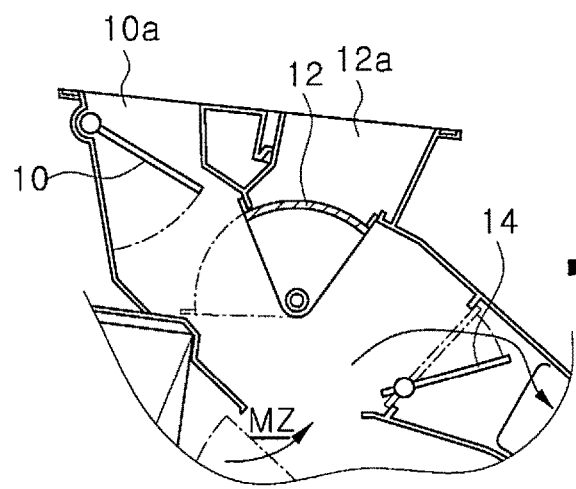
FIG. 5B
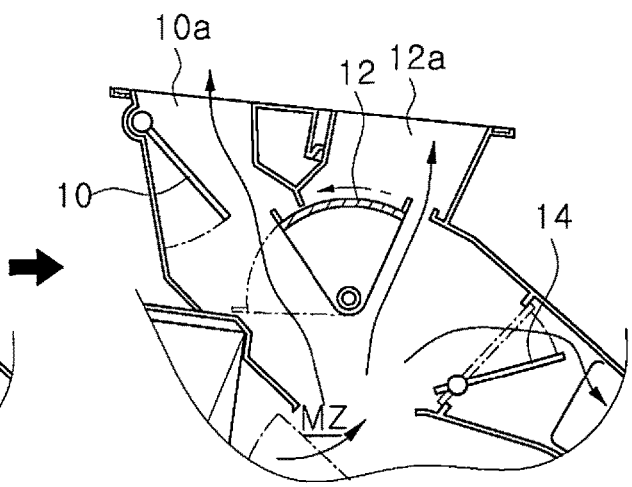
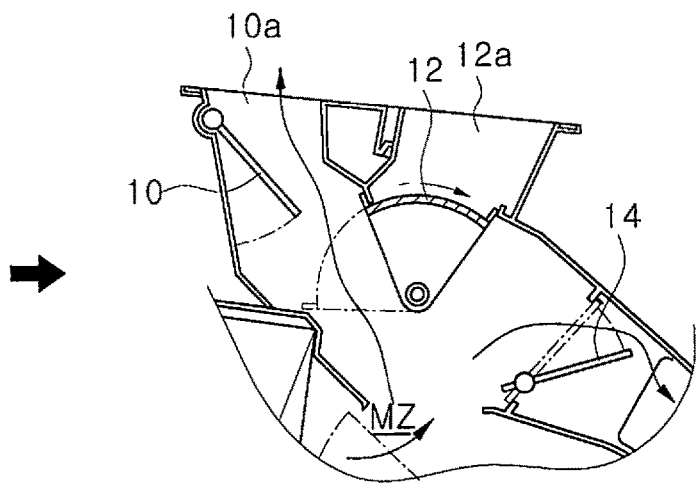
FIG. 5C

FIG. 6A
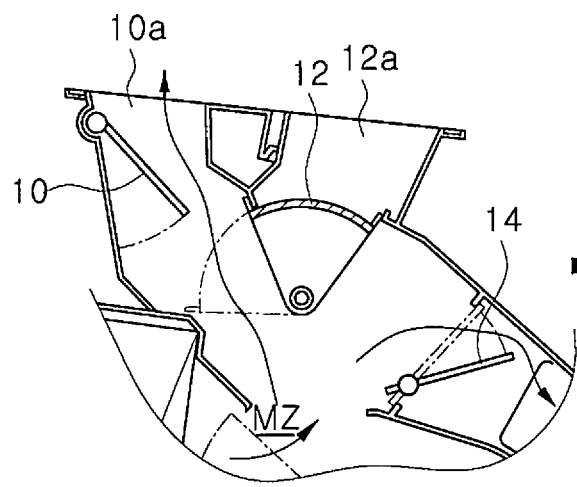
FIG. 6B
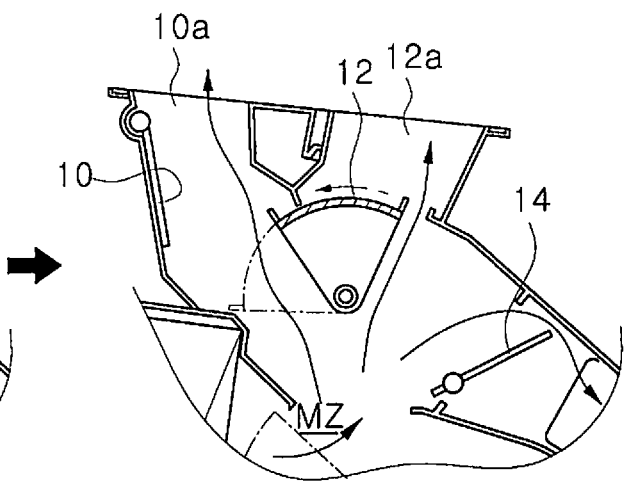
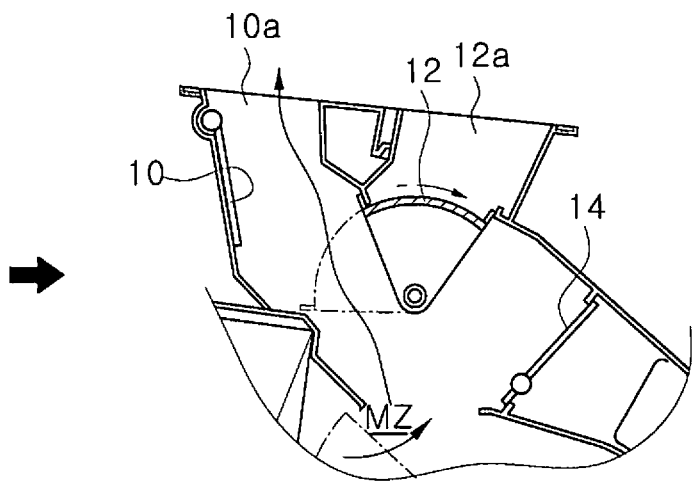
FIG. 6C

VEHICULAR AIR CONDITIONING SYSTEM AND CONTROL METHOD THEREOF

CROSS-REFERENCE TO RELATED PATENT APPLICATIONS

This application claims the benefit of each of Korean Patent Application No. 10-2018-0124832 dated Oct. 19, 2018 and Korean Patent Application No. 10-2019-0011367 dated Jan. 29, 2019. The disclosures of the above patent applications are hereby incorporated herein by reference in their entirety.

TECHNICAL FIELD

The present invention relates to a vehicular air conditioning system and a control method, more particularly, to a vehicular air conditioning system and a control method thereof capable of, when switching an air discharge mode, eliminating an excessive air pressure acting on mode doors, controlling the mode doors to be located at right position, and easily moving the mode doors to positions for a specific air discharge mode without the need for a large startup torque.

BACKGROUND ART

As shown in FIG. 1, the vehicular air conditioning system includes a plurality of mode doors 10, 12 and 14 that control air discharge directions in a passenger compartment.

The mode doors 10, 12 and 14 include a defogging door 10, a vent door 12 and a floor door 14. The mode doors 10, 12 and 14 are operated to cooperate with each other to adjust the discharge direction of air supplied into a passenger compartment.

In particular, as shown in FIG. 2, the mode doors 10, 12 and 14 are controlled in a vent mode M1, a bi-level mode M2, a floor mode M3, a mixed mode M4, a defogging mode M5 and the like so as to control the discharge directions of air supplied into the passenger compartment.

For reference, the vent mode M1 is a mode for discharging cold air or hot air existing in an air conditioning case 19 toward the face of a passenger. The bi-level mode M2 is a mode for discharging cold air or hot air toward the floor surface of a passenger compartment and the face of a passenger. The floor mode M3 is a mode for discharging cold air or hot air toward the floor surface of a passenger compartment. The mixed mode M4 is a mode for discharging cold air or hot air toward a window pane and the floor surface of a passenger compartment. The defogging mode M5 is a mode for discharging cold air or hot air toward a window pane.

On the other hand, even if the mode doors 10, 12 and 14 are controlled in the floor mode M3, the defogging door 10 is configured to open a predetermined amount. Therefore, even in the floor mode M3, a predetermined amount of air is discharged toward the window pane in the passenger compartment.

The reason for adopting this configuration is that, when the floor mode M3 is selected, air discharge is concentrated only on the side of passenger legs so that a temperature difference may occur between the upper and lower portions of the passenger compartment. Therefore, the air is also supplied to the upper portion of the passenger compartment to keep the temperature inside the passenger compartment substantially uniform.

Usually, in the floor mode M3, the air volume distribution ratio of a floor vent 14a to a defogging vent 10a is 80:20. Thus, in the floor mode M3, about 20% of an air may be discharged to the upper portion of the passenger compartment through the defogging vent 10a.

However, in the conventional air conditioner, when the mode doors 10, 12 and 14 are controlled to shift from the floor mode M3 to the mixed mode M4, the defogging door 10 needs to be further opened. In this case, an excessive air pressure acts on the defogging door 10, which makes it quite difficult to operate the defogging door 10.

In particular, the air passing through an evaporator 16 and a heater core 18 is diverted at an angle of about 90° to 180° with respect to a mixing zone MZ under the defogging door 10 and is fed to the floor vent 14a existing on the lower side. An excessive air pressure acts on the lower surface of the defogging door 10 in this process, which makes it very difficult to open the defogging door 10.

Furthermore, when the driving device for driving the mode doors 10, 12 and 14 is a cable traction type, the user should manually rotate a rotary knob (not shown) to control the mode doors 10, 12 and 14 from the floor mode M3 to the mixed mode M4. In this process, the operation of the rotary knob is very difficult due to the air pressure acting on the defogging door 10.

Thus, a large startup torque is required to control the mode doors 10, 12 and 14 from the floor mode M3 to the mixed mode M4. As a result, the operation feeling of the rotary knob deteriorates remarkably.

In the conventional air conditioning system, when the mode doors 10, 12 and 14 are controlled from the mixed mode M4 to the defogging mode M5, it is necessary to open only the defogging door 10 and to completely close the floor door 14. In this process, an excessive air pressure acts on the floor door 14, which makes it impossible to completely close the floor door 14.

In particular, the floor door 14 is closed while rotating in a direction opposite to the flow direction of an air. In this case, an excessive air pressure acts on the closed surface portion of the floor door 14. Thus, the floor door 14 cannot be closed completely.

Furthermore, when the driving device for driving the mode doors 10, 12 and 14 is a cable traction type, the user should manually rotate the rotary knob (not shown) to control the mode doors 10, 12 and 14 from the mixed mode M4 to the defogging mode M5. In this process, the operation of the rotary knob is very difficult due to the air pressure acting on the defogging door 10.

Thus, a large startup torque is required to control the mode doors 10, 12 and 14 from the mixed mode M4 to the defogging mode M5. As a result, the operation feeling of the rotary knob deteriorates remarkably.

SUMMARY

In view of the aforementioned problems inherent in the related art, it is an object of the present invention to provide a vehicular air conditioning system and a control method capable of, when switching an air discharge mode from a floor mode to a mixed mode, eliminating an excessive air pressure acting on a defogging door.

Another object of the present invention is to provide a vehicular air conditioning system and a control method capable of controlling mode doors from a floor mode to a mixed mode without the need for a large startup torque.

A further object of the present invention is to provide a vehicular air conditioning system and a control method capable of making it possible to easily rotate mode doors from floor mode positions to mixed mode positions even when a door driving device is a cable traction type.

A further object of the present invention is to provide a vehicular air conditioning system and a control method capable of improving the operation feeling of a rotary knob.

A further object of the present invention is to provide a vehicular air conditioning system and a control method capable of improving the operation structure of mode doors and eliminating an excessive air pressure acting on a floor door when switching an air discharge mode from a mixed mode to a defogging mode.

A further object of the present invention is to provide a vehicular air conditioning system and a control method capable of making it possible to completely close a floor door when switching an air discharge mode from a mixed mode to a defogging mode.

A further object of the present invention is to provide a vehicular air conditioning system and a control method capable of controlling mode doors from a mixed mode to a defogging mode without the need for a large startup torque.

A further object of the present invention is to provide a vehicular air conditioning system and a control method capable of making it possible to easily rotate mode doors from mixed mode positions to defogging mode positions even when a door driving device is a cable traction type.

A further object of the present invention is to provide a vehicular air conditioning system and a control method capable of improving the operation feeling of a rotary knob.

According to one embodiment of the present invention, there is provided a vehicular air conditioning system, comprising: a plurality of mode doors configured to switch an air discharge mode in a passenger compartment, the mode doors including a defogging door, a vent door and a floor door; and a mode door air pressure reduction part configured to temporarily reduce an air pressure acting on at least one of the mode doors when the air discharge mode is switched.

The mode door air pressure reduction part may be configured to temporarily reduce an air pressure acting on the defogging door for controlling an air discharged toward a window pane, when the air discharge mode is switched from a mode in which the air is discharged toward portions other than the window pane to a mode in which the air is discharged toward the window pane.

The mode door air pressure reduction part may be configured to temporarily reduce the air pressure acting on the defogging door, when the air discharge mode is switched from a floor mode in which the air is discharged toward a floor surface in the passenger compartment to a mixed mode in which the air is discharged toward the window pane and the floor surface in the passenger compartment.

The mode door air pressure reduction part may be configured to temporarily reduce an air pressure acting on the floor door for controlling an air discharged toward a floor surface in the passenger compartment, when the air discharge mode is switched from a mixed mode in which the air is discharged toward a window pane and the floor surface in the passenger compartment to a defogging mode in which the air is discharged toward the window pane.

According to another embodiment of the present invention, there is provided a control method of a vehicular air conditioning system including a plurality of mode doors configured to switch an air discharge mode in a passenger compartment, the mode doors including a defogging door, a vent door and a floor door, the method comprising: a) determining whether an air discharge mode is switched from a mode in which an air is discharged toward portions other than a window pane to a mode in which the air is discharged toward the window pane; and b) temporarily opening the vent door if the air discharge mode is switched from the mode in which the air is discharged toward the portions other than the window pane to the mode in which the air is discharged toward the window pane.

In the above a), it may be determined whether the air discharge mode is switched from a floor mode in which the air is discharged toward a floor surface in the passenger compartment to a mixed mode in which the air is discharged toward the window pane and the floor surface in the passenger compartment. If it is determined in a) that the air discharge mode is switched from the floor mode to the mixed mode, the vent door may be moved in b) to temporarily open a face vent at a timing at which the air discharge mode is switched from the floor mode to the mixed mode.

According to a further embodiment of the present invention, there is provided a control method of a vehicular air conditioning system including a plurality of mode doors configured to switch an air discharge mode in a passenger compartment, the mode doors including a defogging door, a vent door and a floor door, the method comprising: a) determining whether an air discharge mode is switched from a mixed mode in which an air is discharged toward a window pane and a floor surface in the passenger compartment to a defogging mode in which the air is discharged toward the window pane; and b) temporarily opening the vent door if the air discharge mode is switched from the mixed mode to the defogging mode.

According to the vehicular air conditioning system and the control method, the vent door is temporarily opened when the air discharge mode is switched from the floor mode to the mixed mode. Therefore, when switching the air discharge mode from the floor mode to the mixed mode, the air pressure acting on the defogging door can be partially diverted toward the face vent.

Therefore, when the air discharge mode is switched from the floor mode to the mixed mode, it is possible to temporarily reduce the air pressure acting on the defogging door.

Thus, when the air discharge mode is switched from the floor mode to the mixed mode, it is possible to control the defogging door to move from the floor mode position toward the mixed mode position without the need for a large startup torque.

Therefore, in the case of the cable traction type door driving device, it is very easy to rotate the mode doors from the floor mode positions to the mixed mode positions, which makes it possible to improve the operation feeling of the rotary knob.

Furthermore, since the vent door is temporarily opened when the air discharge mode is switched from the mixed mode to the defogging mode, the air pressure acting on the floor door can be partially diverted toward face vent when switching the air discharge mode from the mixed mode to the defogging mode.

Therefore, when the air discharge mode is switched from the mixed mode to the defogging mode, it is possible to temporarily reduce the air pressure acting on the floor door.

Thus, when switching the air discharge mode from the mixed mode to the defogging mode, it is possible to completely close the floor door.

In addition, since the air pressure acting on the floor door can be reduced when switching the air discharge mode from the mixed mode to the defogging mode, it is possible to control the defogging door to move from the mixed mode position toward the defogging mode position without the need for a large startup torque.

Therefore, in the case of the cable traction type door driving device, it is very easy to rotate the mode doors from the mixed mode positions to the defogging mode positions, which makes it possible to improve the operation feeling of the rotary knob.

BRIEF DESCRIPTION OF THE DRAWINGS

FIGS. 5A, 5B and 5C are views showing an operation example of the vehicular air conditioning system according to the present invention, in which a vent door is temporarily opened when a floor mode is switched to a mixed mode.

FIGS. 6A, 6B and 6C are views showing an operation example of the vehicular air conditioning system according to the present invention, in which a vent door is temporarily opened when a mixed mode is switched to a defogging mode.

DETAILED DESCRIPTION

Preferred embodiments of a vehicular air conditioning system and a control method according to the present invention will now be described in detail with reference to the accompanying drawings.

Prior to describing features of a vehicular air conditioning system and a control method according to the present invention, a vehicular air conditioning system will be briefly described with reference to FIGS. 2 and 3.

The vehicular air conditioning system includes mode doors 10, 12 and 14. The mode doors 10, 12 and 14 include a defogging door 10, a vent door 12 and a floor door 14.

These mode doors 10, 12 and 14 are operated to cooperate with each other to adjust the discharge direction of the air supplied into a passenger compartment.

Figure 1:
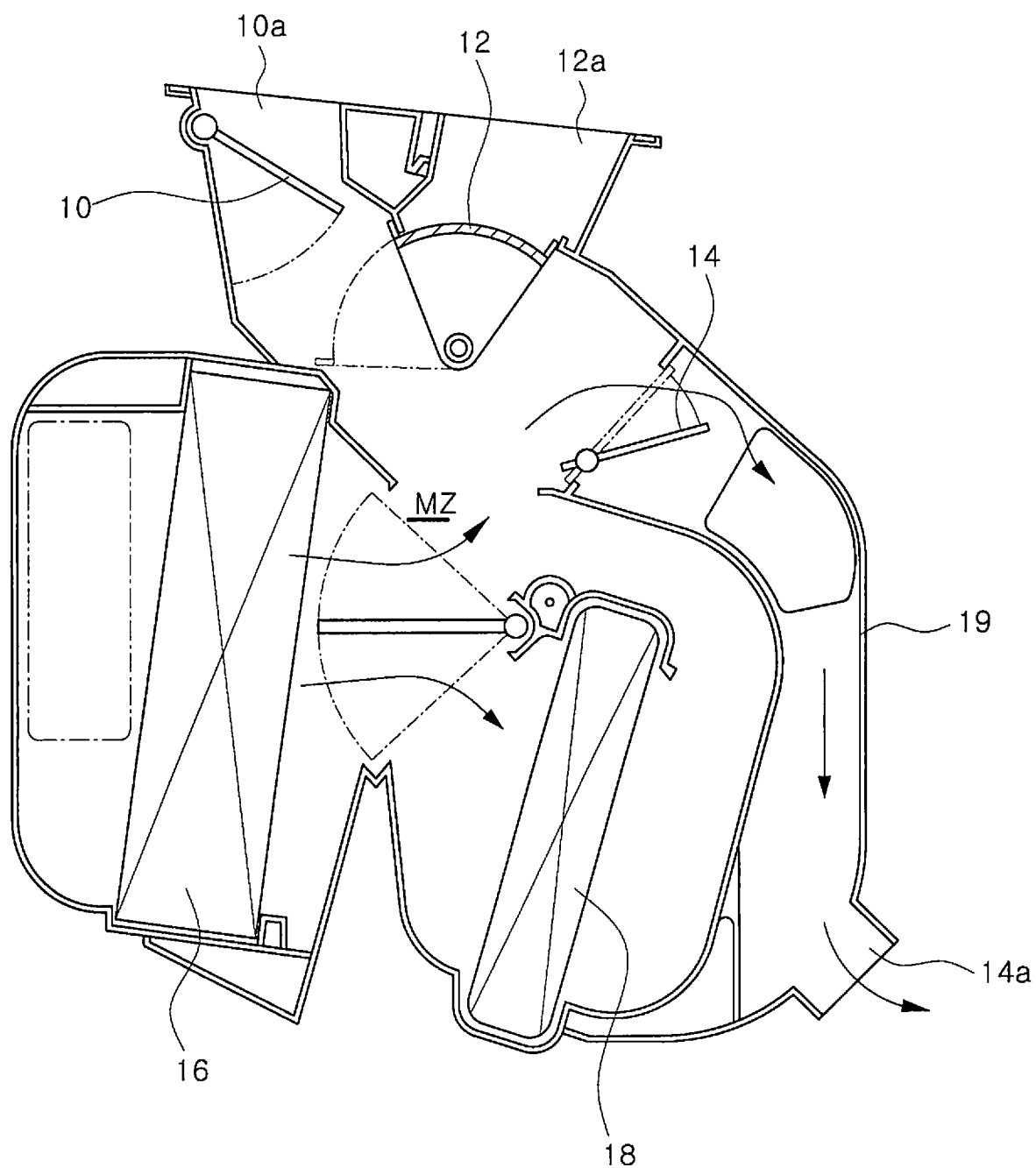
FIG. 1 is a view showing a conventional vehicular air conditioning system.
Figure 2:
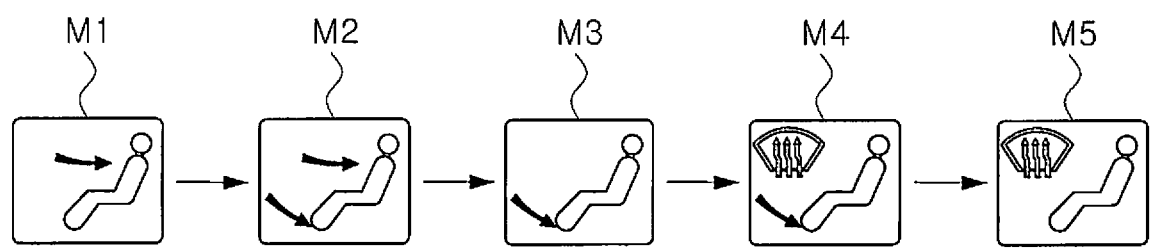
FIG. 2 is a view showing different air discharge modes controlled by the conventional vehicular air conditioning system.

In particular, as shown in FIG. 2, the mode doors 10, 12 and 14 are controlled in a vent mode M1, a bi-level mode M2, a floor mode M3, a mixed mode M4, a defogging mode M5 and the like, thereby controlling the discharge mode of the air supplied into the passenger compartment.

Even if the mode doors 10, 12 and 14 are controlled in the floor mode M3, the defogging door 10 is opened by a predetermined amount. Therefore, even in the floor mode M3, a predetermined amount of air is discharged toward the window pane in the passenger compartment.

Usually, in the floor mode M3, the air volume distribution ratio of a floor vent 14a to a defogging vent 10a is 80:20. Therefore, in the floor mode M3, about 20% of the air is discharged to the upper portion of the passenger compartment through the defogging vent 10a.

Next, the features of the vehicular air conditioning system according to the present invention will be described in detail with reference to FIGS. 3 to 6.

Figure 3:
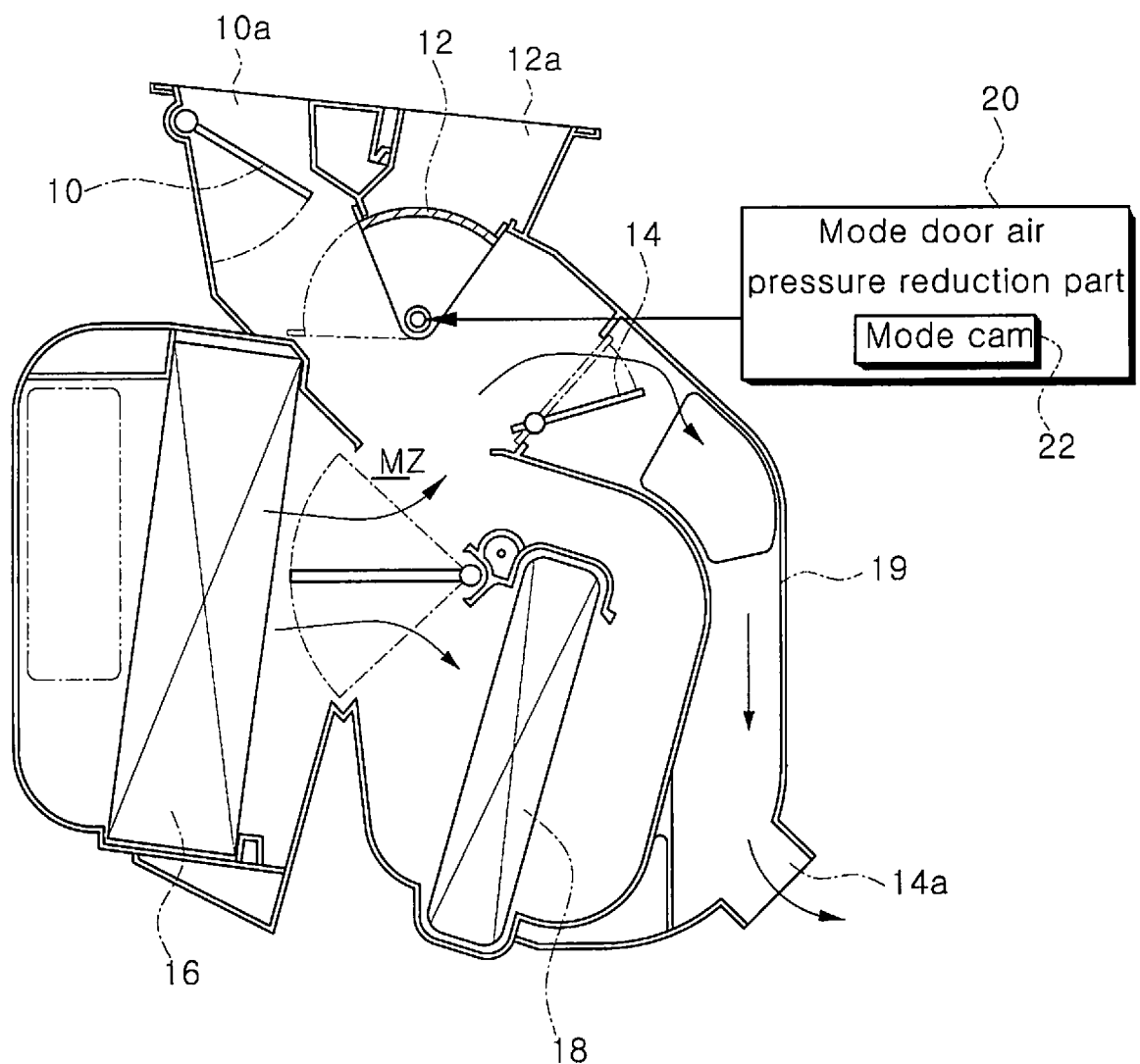
FIG. 3 is a view showing the configuration of a vehicular air conditioning system according to the present invention.

Referring first to FIG. 3, the vehicular air conditioning system according to the present invention further includes a mode door air pressure reduction part 20 capable of reducing the air pressure acting on at least one of the mode doors 10, 12 and 14 when a specific air discharge mode (hereinafter referred to as an "existing air discharge mode" is switched to a new air discharge mode).

The mode door air pressure reduction part 20 is configured to reduce the air pressure acting on the defogging door 10, for example, when the floor mode M3 in which the air is discharged toward the floor surface in the passenger compartment is switched to the mixed mode M4 in which the air is discharged toward the window pane and the floor surface in the passenger compartment (see FIG. 2).

The mode door air pressure reduction part 20 includes a mode cam 22 for controlling the respective positions of the mode doors 10, 12 and 14.

Figure 4A:
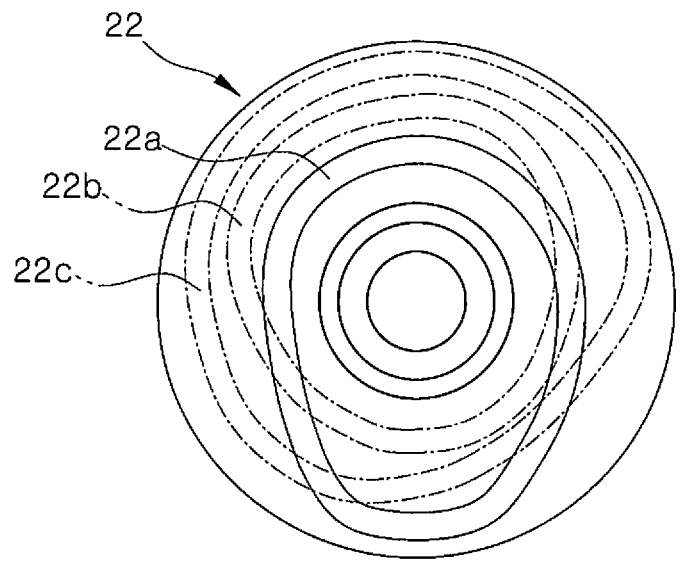
FIGS. 4A and 4B are views showing a conventional mode cam and a mode cam as a mode door air pressure reduction part constituting the vehicular air conditioning system according to the present invention.

As shown in FIG. 4, the mode cam 22 has a plurality of slots 22a, 22b and 22c capable of controlling the positions of the mode doors 10, 12 and 14. By improving the trajectory shapes of the slots 22a, 22b and 22c, when the air discharge mode is switched from the floor mode M3 to the mixed mode M4, the vent door 12 is controlled so as to be temporarily opened by a predetermined amount as shown in FIG. 5.

In particular, as shown in FIG. 4, by improving the trajectory of the vent door slot 22a for controlling the position of the vent door 12 among the slots 22a, 22b and 22c of the mode cam 22, when the air discharge mode is switched from the floor mode M3 to the mixed mode M4, the position of the vent door 12 is controlled in a such direction as to temporarily open the face vent 12a.

More specifically, when the air discharge mode is switched from the floor mode M3 to the mixed mode M4, the vent door 12 is controlled in such a direction as to be temporarily opened.

Therefore, as shown in FIG. 5, the air in an air conditioning case 19 is discharged toward the face vent 12a when the air discharge mode is switched from the floor mode M3 to the mixed mode M4. Thus, the internal air pressure of the air conditioning case 19 is temporarily reduced.

As a result, the air pressure acting on the defogging door 10 is temporarily reduced at the time of switching the air discharge mode from the floor mode M3 to the mixed mode M4. Accordingly, the excessive air pressure acting on the defogging door 10 is eliminated when the air discharge mode is switched from the floor mode M3 to the mixed mode M4.

Accordingly, when switching the air discharge mode from the floor mode M3 to the mixed mode M4, all the mode doors 10, 12 and 14 including the defogging door 10 can be controlled to move from floor mode positions to mixed mode positions without the need for a large startup torque.

Thus, when the mode cam 22 is rotated through cable traction and the mode doors 10, 12 and 14 are controlled through the mode cam 22, the mode cam 22 can be easily rotated from a floor mode position to a mixed mode position.

As a result, the operation feeling of a rotary knob (not shown) for rotating the mode cam 22 can be remarkably improved.

Figure 4B:
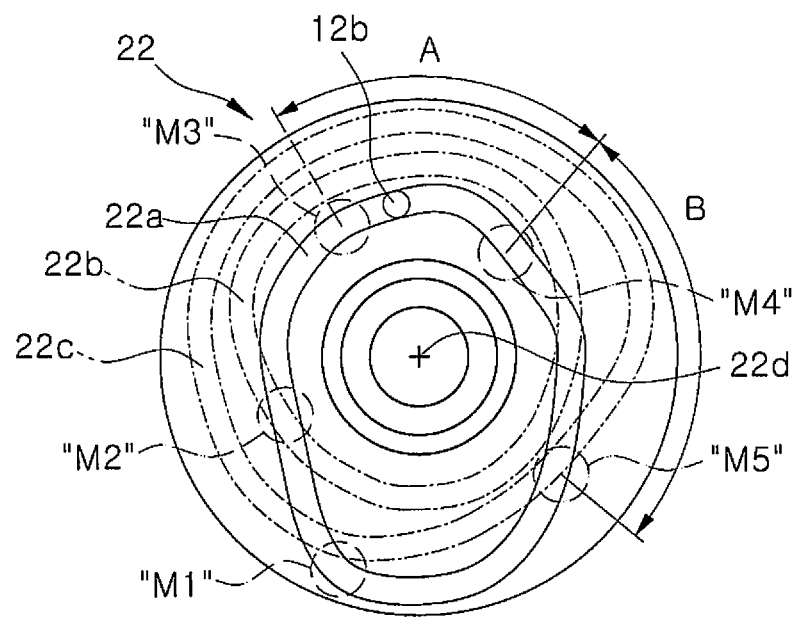

Preferably, as shown in FIG. 4B, the shape of the trajectory of the vent door slot 22a of the mode cam 22 in a specific slot section A for controlling the position of the vent door 12 from a floor mode position to a mixed mode position is improved so that the trajectory of the vent door slot 22a in the specific slot section A is bent away from the rotation center axis 22d of the mode cam 22.

Therefore, when the air discharge mode is switched from the floor mode M3 to the mixed mode M4, the connecting pin 12b of the vent door 12 sliding along the vent door slot 22a is moved radially outward while passing through the specific slot section A of the vent door slot 22a.

Thus, as shown in FIG. 5, when the air discharge mode is switched from the floor mode M3 to the mixed mode M4, the vent door 12 rotates at a predetermined angle in such a direction as to open the face vent 12a.

Preferably, the trajectory of the vent door slot 22a in the specific slot section A has such a shape that the vent door 12 is opened at an angle of about 5° from a position at which the face vent 12a is completely closed.

In addition, the trajectory of the vent door slot 22a in the specific slot section A has such a shape that when the switching of the air discharge mode from the floor mode M3 to the mixed mode M4 is completed, the vent door 12 returns to its original position where the face vent 12a is completely closed.

Referring back to FIG. 3, the mode door air pressure reduction part 20 is also configured to reduce the air pressure acting on the floor door 14 when the air discharge mode is switched from the mixed mode M4 for discharging the air toward the window pane and the floor surface in the passenger compartment to the defogging mode M5 for discharging the air toward the window pane (see FIG. 2).

To this end, in the mode cam 22 of the mode door air pressure reduction part 20, as shown in FIG. 4B, the trajectory shapes of the slots 22a, 22b and 22c are improved such that when the air discharge mode is switched from the mixed mode M4 to the defogging mode M5, the vent door 12 is temporarily opened by a predetermined amount as shown in FIG. 6.

In particular, as shown in FIG. 4B, by improving the trajectory of the vent door slot 22a for controlling the position of the vent door 12 among the slots 22a, 22b and 22c of the mode cam 22, when the air discharge mode is switched from the mixed mode M4 to the defogging mode M5, the position of the vent door 12 is controlled in such a direction as to temporarily open the face vent 12a by a predetermined amount.

More specifically, by improving the shape of the trajectory of the vent door slot 22a in a specific slot section B for controlling the position of the vent door 12 from the mixed mode position to the defogging mode position, when the air discharge mode is switched from the mixed mode M4 to the defogging mode M5, the vent door 12 is controlled to be temporarily opened.

Therefore, as shown in FIG. 6, when the air discharge mode is switched from the mixed mode M4 to the defogging mode M5, the air in the air conditioning case 19 is partially discharged toward the face vent 12a. Thus, the internal air pressure of the air conditioning case 19 is temporarily reduced.

As a result, the air pressure acting on the floor door 14 is temporarily reduced when the air discharge mode is switched from the mixed mode M4 to the defogging mode M5. This makes it possible to eliminate the excessive air pressure acting on the floor door 14 when the air discharge mode is switched from the mixed mode M4 to the defogging mode M5.

Thus, the floor door 14 can be completely closed when the air discharge mode is switched from the mixed mode M4 to the defogging mode M5.

In addition, when the air discharge mode is switched from the mixed mode M4 to the defogging mode M5, the excessive air pressure acting on the floor door 14 is eliminated. Thus, when the air discharge mode is switched from the mixed mode M4 to the defogging mode M5, all the mode doors 10, 12 and 14 including the floor door 14 can be controlled to move from the mixed mode positions to the defogging mode positions without the need for a large startup torque.

Thus, when the mode cam 22 is rotated through cable traction and the mode doors 10, 12 and 14 are controlled through the mode cam 22, it is very easy to rotate the mode cam 22 from the mixed mode M4 to the defogging mode M5. As a result, the operation feeling of the rotary knob (not shown) for rotating the mode cam 22 can be remarkably improved.

Preferably, as shown in FIG. 4B, the shape of the trajectory of the vent door slot 22a of the mode cam 22 in a specific slot section B for controlling the position of the vent door 12 from a mixed mode position to a defogging mode position is improved so that the trajectory of the vent door slot 22a in the specific slot section B is bent away from the rotation center axis 22d of the mode cam 22.

Therefore, when the air discharge mode is switched from the mixed mode M4 to the defogging mode M5, the connecting pin 12b of the vent door 12 sliding along the vent door slot 22a is moved radially outward while passing through the specific slot section B of the vent door slot 22a.

Thus, as shown in FIG. 6, when the air discharge mode is switched from the mixed mode M4 to the defogging mode M5, the vent door 12 rotates at a predetermined angle in such a direction as to open the face vent 12a.

Preferably, the trajectory of the vent door slot 22a in the specific slot section B has such a shape that the vent door 12 is opened at an angle of about 5° from a position at which the face vent 12a is completely closed.

In addition, the trajectory of the vent door slot 22a in the specific slot section B has such a shape that when the switching of the air discharge mode from the mixed mode M4 to the defogging mode M5 is completed, the vent door 12 returns to its original position where the face vent 12a is completely closed.

Figure 7:
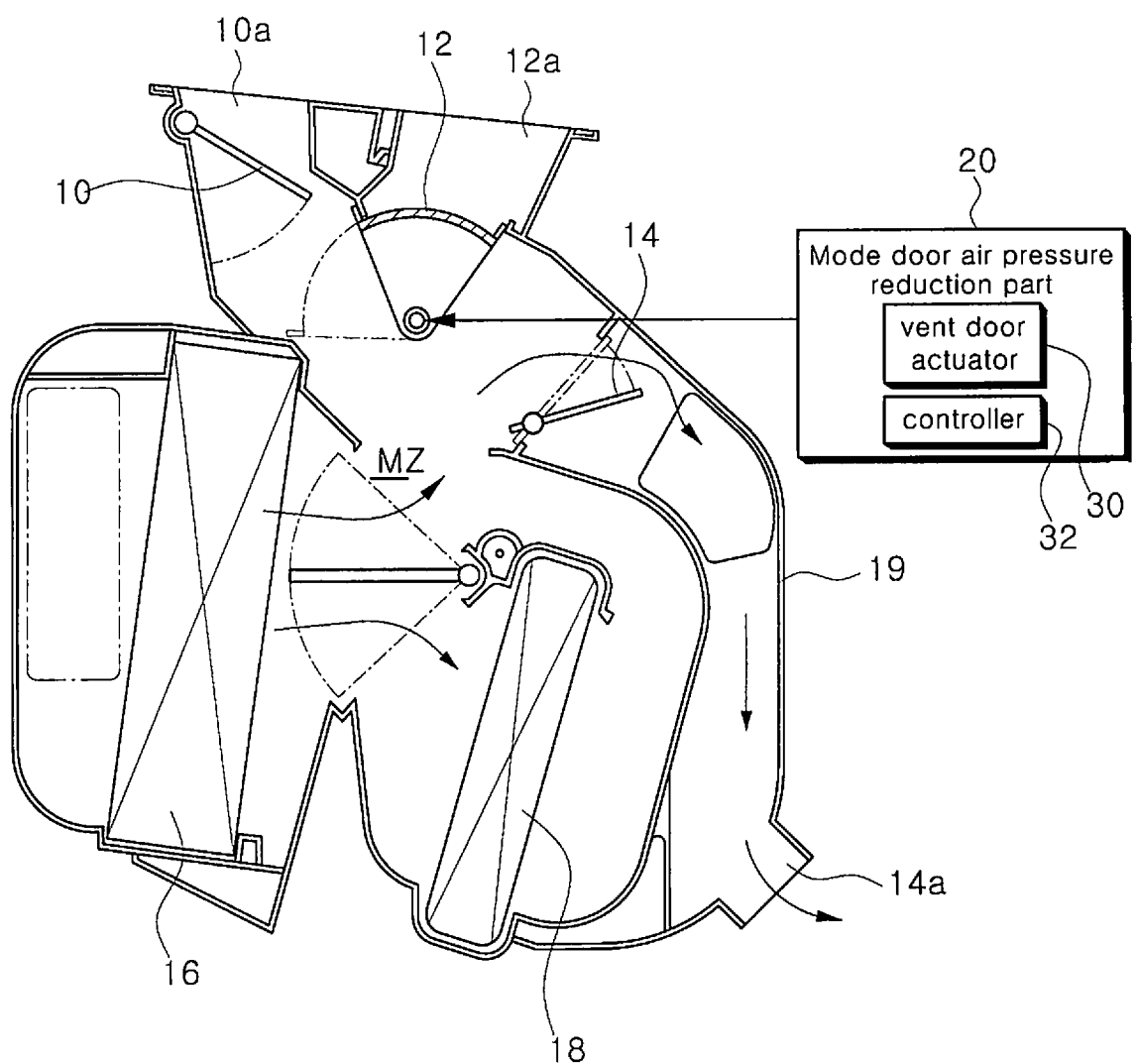
FIG. 7 is a view showing another example of the mode door air pressure reduction part constituting the vehicular air conditioning system according to the present invention.

Next, another example of the mode door air pressure reduction part 20 constituting the vehicular air conditioning system according to the present invention will be described with reference to FIG. 7.

In the mode door air pressure reduction part 20 according to another example, the driving device for driving the respective mode doors 10, 12 and 14 is an actuator type. The driving device includes a vent door actuator 30 for controlling the position of the vent door 12 and a controller 32 for controlling the vent door actuator 30.

The vent door actuator 30 is operated in response to a control signal applied thereto. The vent door actuator 30 controls the vent door 12 to move to a vent mode position, a bi-level mode position, a floor mode position, a mixed mode position and a defogging mode position (see FIG. 2).

Particularly, upon receiving a signal indicating the switching of the air discharge mode from the floor mode M3 to the mixed mode M4, the vent door actuator 30 moves the vent door 12 from the floor mode position to the mixed mode position.

In addition, upon receiving a signal indicating the switching of the air discharge mode from the mixed mode M4 to the defogging mode M5, the vent door actuator 30 moves the vent door 12 from the mixed mode position to the defogging mode position.

The controller 32 is equipped with a microprocessor. The controller 32 controls the vent door actuator 30 so as to temporarily open the vent door 12 when the air discharge mode is switched from the floor mode M3 to the mixed mode M4.

In particular, as shown in FIG. 5, when the air discharge mode is switched from the floor mode M3 to the mixed mode M4, the controller 32 controls the vent door actuator 30 so as to move the vent door 12 in such a direction as to temporarily open the face vent 12a.

Accordingly, when the air discharge mode is switched from the floor mode M3 to the mixed mode M4, the air in the air conditioning case 19 is discharged toward the face vent 12a, whereby the air pressure in the air conditioning case 19 is temporarily reduced.

As a result, when the air discharge mode is switched from the floor mode M3 to the mixed mode M4, the air pressure acting on the defogging door 10 is temporarily reduced to eliminate the excessive air pressure acting on the defogging door 10.

Therefore, when switching the air discharge mode from the floor mode M3 to the mixed mode M4, the defogging door 10 can be controlled to move from the floor mode position to the mixed mode position without the need for a large startup torque.

This reduces the driving load of a defogging door actuator (not shown) for driving the defogging door 10.

On the other hand, when the switching of the air discharge mode from the floor mode M3 to the mixed mode M4 is completed, the controller 32 controls the vent door actuator 30 so that the vent door 12 returns to the original position where the face vent 12a is completely closed.

When the air discharge mode is switched from the mixed mode M4 to the defogging mode M5, the controller 32 controls the vent door actuator 30 so as to temporality open the vent door 12.

In particular, as shown in FIG. 6, when the air discharge mode is switched from the mixed mode M4 to the defogging mode M5, the controller 32 controls the vent door actuator 30 so as to move the vent door 12 in such a direction as to temporarily open the face vent 12a in a predetermined amount.

Therefore, when the air discharge mode is switched from the mixed mode M4 to the defogging mode M5, the air in the air conditioning case 19 is discharged toward the face vent 12a, whereby the air pressure in the air conditioning case 19 is temporarily reduced.

As a result, when the air discharge mode is switched from the mixed mode M4 to the defogging mode M5, the air pressure acting on the floor door 14 is temporarily reduced to eliminate the excessive air pressure acting on the floor door 14.

Accordingly, the floor door 14 can be completely closed when the air discharge mode is switched from the mixed mode M4 to the defogging mode M5.

In addition, when the air discharge mode is switched from the mixed mode M4 to the defogging mode M5, the excessive air pressure acting on the floor door 14 is eliminated. Thus, when switching the air discharge mode from the mixed mode M4 to the defogging mode M5, the floor door 14 can be controlled to move from the mixed mode position to the defogging mode position without the need for a large startup torque.

This reduces the driving load of a floor door actuator (not shown) for driving the floor door 14.

On the other hand, when the switching of the air discharge mode from the mixed mode M4 to the defogging mode M5 is completed, the controller 32 controls the vent door actuator 30 so that the vent door 12 returns to the original position where the face vent 12a is completely closed.

Next, a vehicular air conditioning system control method according to the present invention will be described with reference to FIGS. 8 and 5.

Figure 8:
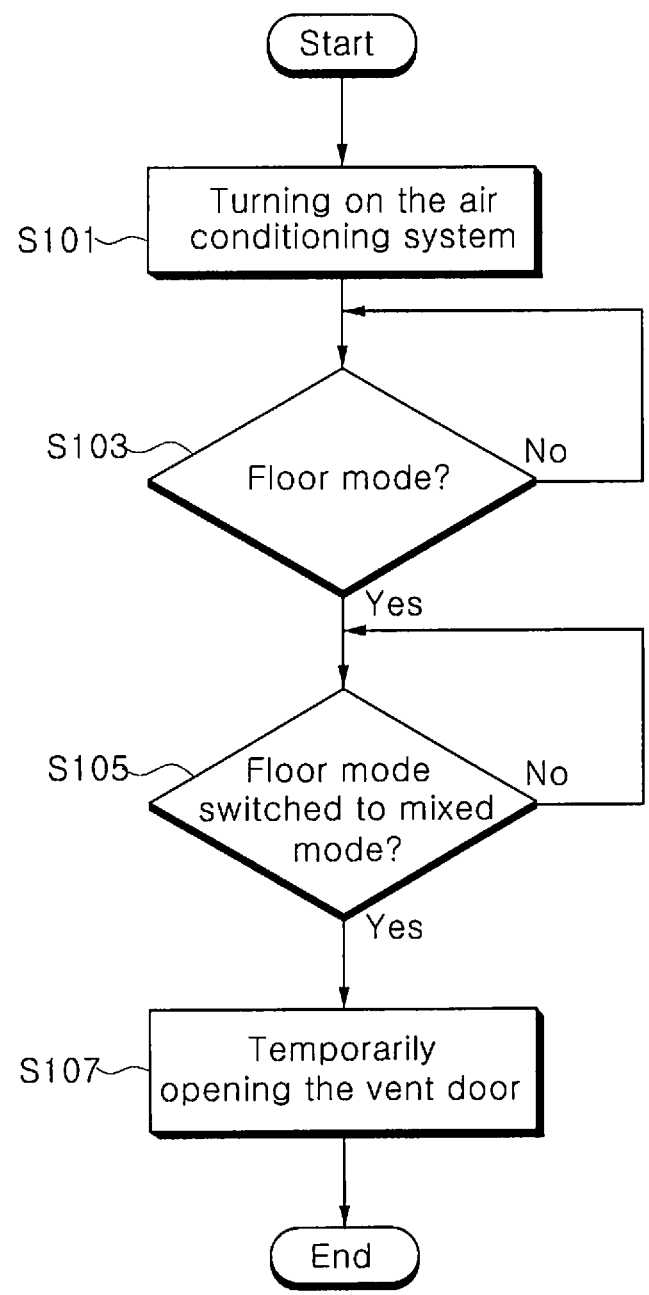
FIG. 8 is a flowchart illustrating a vehicular air conditioning system control method according to the present invention, in which a floor mode is switched to a mixed mode.

Referring first to FIG. 8, a vehicular air conditioning system control method when the floor mode M3 is switched to the mixed mode M4 will be described.

The air conditioner is turned on (S101). In this state, it is determined whether the air discharge mode is the floor mode M3 (S103).

If it is determined that the air conditioning mode is the floor mode M3, it is determined whether the air discharge mode is switched from the floor mode M3 to the mixed mode M4 (S105).

If it is determined that the floor mode M3 is switched to the mixed mode M4, the vent door 12 is temporarily opened at the time of switching the floor mode M3 to the mixed mode M4 (S107).

Then, as shown in FIG. 5, the air in the air conditioning case 19 is partially discharged toward the face vent 12a, thereby temporarily reducing the air pressure in the air conditioning case 19.

As a result, the air pressure acting on the defogging door 10 is temporarily eliminated, whereby the defogging door 10 is easily controlled to move from the floor mode position to the mixed mode position without the need for a large startup torque.

On the other hand, when the floor mode M3 is switched to the mixed mode M4 during step S107, the vent door 12 is temporarily opened. If the switching of the air discharge mode from the floor mode M3 to the mixed mode M4 is completed, the vent door 12 is controlled to move to its original position to close the face vent 12a.

Figure 9:
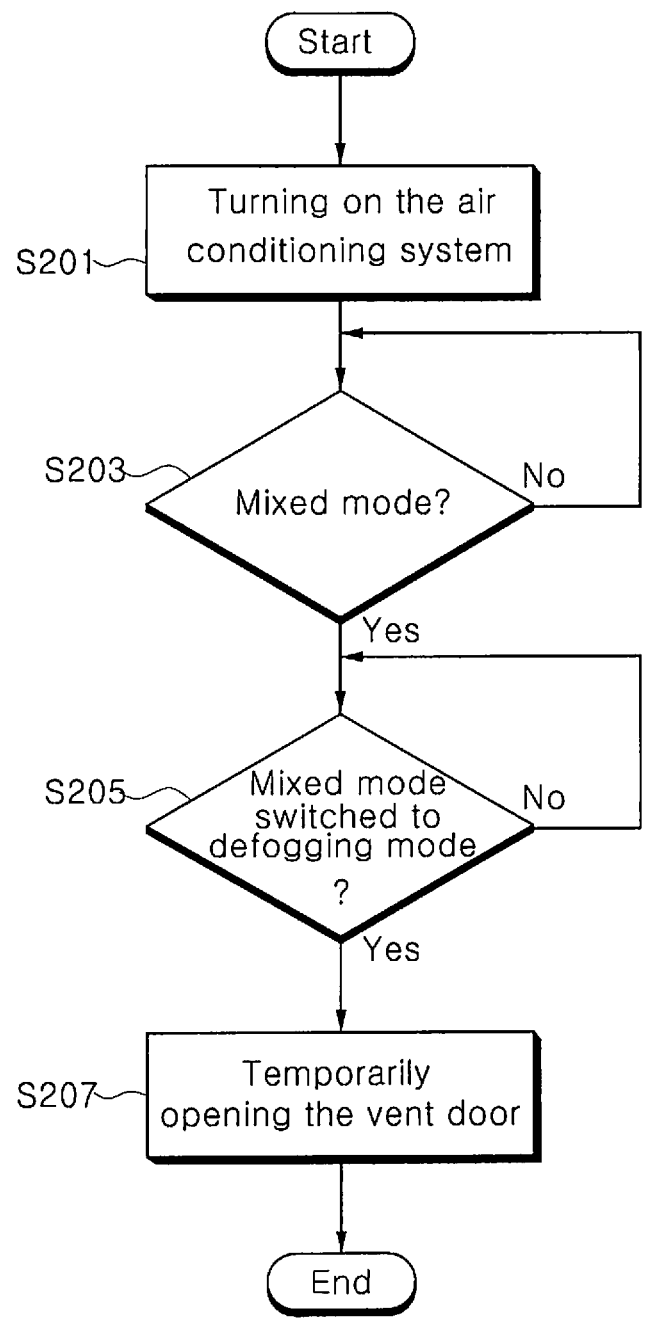
FIG. 9 is a flowchart illustrating a vehicular air conditioning system control method according to the present invention, in which a mixed mode is switched to a defogging mode.

Referring next to FIG. 9, a vehicular air conditioning system control method when the mixed mode M4 is switched to the defogging mode M5 will be described.

The air conditioner is first turned on (S201). In this state, it is determined whether the air discharge mode is the mixed mode M4 (S203).

If it is determined that the air conditioning mode is the mixed mode M4, it is determined whether the air discharge mode is switched from the mixed mode M4 to the defogging mode M5 (S205).

If it is determined that the mixed mode M4 is switched to the defogging mode M5, the vent door 12 is temporarily opened at the time of switching the mixed mode M4 to the defogging mode M5 (S207).

Then, as shown in FIG. 6, the air in the air conditioning case 19 is partially discharged toward the face vent 12a, thereby temporarily reducing the air pressure in the air conditioning case 19.

As a result, the air pressure acting on the floor door 14 is temporarily eliminated and the floor door 14 is completely closed, whereby the floor door 14 is easily controlled to move from the mixed mode position to the defogging mode position without the need for a large startup torque.

On the other hand, when the mixed mode M4 is switched to the defogging mode M5 during step S207, the vent door 12 is temporarily opened. If the switching of the air discharge mode from the mixed mode M4 to the defogging mode M5 is completed, the vent door 12 is controlled to move to its original position to close the face vent 12a.

While the preferred embodiments of the present invention have been described above, the present invention is not limited to the above-described embodiments. Various modifications and changes may be made without departing from the scope and spirit of the present invention defined in the claims.

What is claimed is:

1. A vehicular air conditioning system, comprising:
    a plurality of mode doors configured to switch an air discharge mode in a passenger compartment, the mode doors including a defogging door, a vent door and a floor door; and
    a mode door air pressure reduction part configured to temporarily reduce an air pressure acting on at least one of the mode doors when the air discharge mode is switched.

2. The system of claim 1, wherein the mode door air pressure reduction part is configured to temporarily reduce an air pressure acting on the defogging door for controlling an air discharged toward a window pane, when the air discharge mode is switched from a mode in which the air is discharged toward portions other than the window pane to a mode in which the air is discharged toward the window pane.

3. The system of claim 2, wherein the mode door air pressure reduction part is configured to temporarily reduce the air pressure acting on the defogging door, when the air discharge mode is switched from a floor mode in which the air is discharged toward a floor surface in the passenger compartment to a mixed mode in which the air is discharged toward the window pane and the floor surface in the passenger compartment.

4. The system of claim 3, further comprising:
    a mode cam configured to adjust positions of the mode doors depending on rotational positions thereof to realize a specific air discharge mode,
    wherein the mode cam has a plurality of slots for adjusting the positions of the mode doors as the mode cam rotates, and
    the mode door air pressure reduction part includes the slots of the mode cam formed such that when the mode cam is rotated to a specific position to switch the air discharge mode from the floor mode to the mixed mode, the vent door is temporarily opened to discharge a part of the air acting on the defogging door toward a face vent.

5. The system of claim 4, wherein the mode door air pressure reduction part includes a vent door slot formed in the mode cam to adjust a position of the vent door, and
    the vent door slot has a trajectory for temporarily opening the vent door when the mode cam is rotated to a specific position to switch the air discharge mode from the floor mode to the mixed mode.

6. The system of claim 5, wherein the trajectory of the vent door slot in a specific slot section for controlling the position of the vent door from a floor mode position to a mixed mode position is bent away from a rotation center axis of the mode cam such that in the specific slot section, the vent door is moved in such a direction as to temporarily open the face vent.

7. The system of claim 6, wherein the trajectory of the vent door slot of the mode cam is set such that when the switching of the air discharge mode from the floor mode to the mixed mode is completed, the vent door returns to an original position at which the face vent is closed.

8. The system of claim 3, further comprising:
    a plurality of actuators configured to adjust positions of the mode doors in response to a control signal to realize a specific air discharge mode,
    wherein the mode door air pressure reduction part includes a controller configured to control the actuators such that when the air discharge mode is switched from the floor mode to the mixed mode, the vent door is controlled to temporarily open a face vent to discharge a part of the air acting on the defogging door toward the face vent.

9. The system of claim 8, wherein the controller is configured to control the actuators such that when the switching of the air discharge mode from the floor mode to the mixed mode is completed, the vent door returns to an original position at which the face vent is closed.

10. The system of claim 1, wherein the mode door air pressure reduction part is configured to temporarily reduce an air pressure acting on the floor door for controlling an air discharged toward a floor surface in the passenger compartment, when the air discharge mode is switched from a mixed mode in which the air is discharged toward a window pane and the floor surface in the passenger compartment to a defogging mode in which the air is discharged toward the window pane.

11. The system of claim 10, further comprising:
    a mode cam configured to adjust positions of the mode doors depending on rotational positions thereof to realize a specific air discharge mode,
    wherein the mode cam has a plurality of slots for adjusting the positions of the mode doors as the mode cam rotates, and
    the mode door air pressure reduction part includes the slots of the mode cam formed such that when the mode cam is rotated to a specific position to switch the air discharge mode from the mixed mode to the defogging mode, the vent door is temporarily opened to discharge a part of the air acting on the floor door toward a face vent.

12. The system of claim 11, wherein the mode door air pressure reduction part includes a vent door slot formed in the mode cam to adjust a position of the vent door, and
    the vent door slot has a trajectory for temporarily opening the vent door when the mode cam is rotated to a specific position to switch the air discharge mode from the mixed mode to the defogging mode.

13. The system of claim 12, wherein the trajectory of the vent door slot in a specific slot section for controlling the position of the vent door from the mixed mode to the defogging mode is bent away from a rotation center axis of the mode cam such that in the specific slot section, the vent door is moved in such a direction as to temporarily open the face vent.

14. The system of claim 13, wherein the trajectory of the vent door slot of the mode cam is set such that when the switching of the air discharge mode from the mixed mode to the defogging mode is completed, the vent door returns to an original position at which the face vent is closed.

15. The system of claim 10, further comprising:
    a plurality of actuators configured to adjust positions of the mode doors in response to a control signal to realize a specific air discharge mode, wherein the mode door air pressure reduction part includes a controller configured to control the actuators such that when the air discharge mode is switched from the mixed mode to the defogging mode, the vent door is controlled to temporarily open a face vent to discharge a part of the air acting on the floor door toward the face vent.

16. The system of claim 15, wherein the controller is configured to control the actuators such that when the switching of the air discharge mode from the mixed mode to the defogging mode is completed, the vent door returns to an original position at which the face vent is closed.

17. A control method of a vehicular air conditioning system including a plurality of mode doors configured to switch an air discharge mode in a passenger compartment, the mode doors including a defogging door, a vent door and a floor door, the method comprising:
 a) determining whether an air discharge mode is switched from a mode in which an air is discharged toward portions other than a window pane to a mode in which the air is discharged toward the window pane; and
 b) temporarily opening the vent door in response to the air discharge mode being switched from the mode in which the air is discharged toward the portions other than the window pane to the mode in which the air is discharged toward the window pane so as to temporarily reduce an air pressure acting on the defogging door for controlling an air discharged toward a window pane.

18. The control method of claim 17, wherein in a), it is determined whether the air discharge mode is switched from a floor only mode in which the air is discharged toward a floor surface in the passenger compartment to a mixed mode in which the air is discharged toward the window pane and the floor surface in the passenger compartment.

19. The control method of claim 18, wherein in response to determining in a) that the air discharge mode is switched from the floor mode to the mixed mode, the vent door is moved b) to temporarily open a face vent at a timing at which the air discharge mode is switched from the floor mode to the mixed mode.

20. The control method of claim 17, wherein in response to the air discharge mode from the floor mode to the mixed mode being completed during b), the vent door is returned to an original position at which the face vent is closed.

21. A control method of a vehicular air conditioning system including a plurality of mode doors configured to switch an air discharge mode in a passenger compartment, the mode doors including a defogging door, a vent door and a floor door, the method comprising:
 a) determining whether an air discharge mode is switched from a mixed mode in which an air is discharged toward a window pane and a floor surface in the passenger compartment to a defogging mode in which the air is discharged toward the window pane; and
 b) temporarily opening the vent door in response to the air discharge mode being switched from the mixed mode to the defogging mode so as to temporarily reduce an air pressure acting on the defogging door for controlling an air discharged toward a window pane.

22. The control method of claim 21, wherein in response to the air discharge mode from the mixed mode to the defogging mode being completed during b), the vent door is returned to an original position at which the face vent is closed.

* * * * *